United States Patent
Joseph

(10) Patent No.: US 12,212,194 B2
(45) Date of Patent: Jan. 28, 2025

(54) STATOR SWITCHING MODULE

(71) Applicant: Ford Global Technologies, LLC, Dearborn, MI (US)

(72) Inventor: Matthew Joseph, St. Clair Shores, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 710 days.

(21) Appl. No.: 17/522,520

(22) Filed: Nov. 9, 2021

(65) Prior Publication Data

US 2023/0145148 A1    May 11, 2023

(51) Int. Cl.
| | |
|---|---|
| *H02K 11/33* | (2016.01) |
| *H02K 3/50* | (2006.01) |
| *H02K 5/20* | (2006.01) |
| *H02K 9/19* | (2006.01) |
| *H02K 11/25* | (2016.01) |
| *H02K 15/00* | (2006.01) |
| *H02P 25/18* | (2006.01) |
| *B60K 1/02* | (2006.01) |

(52) U.S. Cl.
CPC ............... *H02K 11/33* (2016.01); *H02K 3/50* (2013.01); *H02K 5/203* (2021.01); *H02K 9/19* (2013.01); *H02K 11/25* (2016.01); *H02K 15/0081* (2013.01); *H02P 25/184* (2013.01); *B60K 1/02* (2013.01); *H02K 2203/09* (2013.01)

(58) Field of Classification Search
CPC ........... H02K 15/0025; H02K 15/0087; H02K 15/0414; H02K 15/0421; H02K 15/0428; H02K 15/064; H02K 15/0081; H02K 3/50; H02K 9/19; H02K 11/33; H02K 11/30; H02K 5/203; H02K 11/25; H02K 2203/09; H02K 2213/09; H02P 25/184; B60K 17/354; B60K 2001/003; B60K 1/00; B60K 1/02; B60K 2001/001; B60K 11/02; B60K 2001/006; B60K 17/356
USPC ........................................................ 310/68 R
See application file for complete search history.

(56) References Cited

U.S. PATENT DOCUMENTS

| | | | |
|---|---|---|---|
| 8,183,814 B2 | 5/2012 | Fuchs | |
| 10,618,424 B2 | 4/2020 | Joseph et al. | |
| 2012/0112680 A1* | 5/2012 | Chamberlin | H02K 11/33 310/54 |
| 2019/0222078 A1* | 7/2019 | Liang | H02K 15/0414 |
| 2020/0039364 A1* | 2/2020 | Joseph | B60L 3/108 |
| 2020/0307392 A1 | 10/2020 | Joseph et al. | |

FOREIGN PATENT DOCUMENTS

CN    105591570 A    5/2016

* cited by examiner

*Primary Examiner* — Alexander A Singh
(74) *Attorney, Agent, or Firm* — David B. Kelley; Brooks Kushman P.C.

(57) ABSTRACT

A switching module includes a housing that can be attached directly to an end of a stator and over line and neutral phase hairpins of the stator, electrically conductive platforms disposed in the housing and that can contact some of the hairpins, switches disposed in the housing, connected with the platforms, and that can selectively change connections of the hairpins between wye and delta configurations, and a conduit defining a coolant channel through the housing.

15 Claims, 6 Drawing Sheets

STATOR SWITCHING MODULE

TECHNICAL FIELD

This disclosure relates to wye-delta electric drive systems.

BACKGROUND

Electric machines are used to propel and brake vehicles. The electric machines are comprised of a number of windings that may be connected in a wye or delta configuration. The peak torque and power characteristics of the electric machine are dependent on the type of connection.

SUMMARY

An electric machine assembly has a stator including three or more phase hairpins and neutral hairpins, and a switching module attached directly to an end of the stator and over the phase hairpins and neutral hairpins. The switching module includes a housing defining a cavity containing platforms in contact with the some of the phase hairpins and neutral hairpins and switches connected with the platforms that selectively change connections of the phase hairpins between a wye configuration and a delta configuration.

A switching module for a stator includes a housing configured to be attached directly to an end of the stator and over line and neutral phase hairpins of the stator, electrically conductive platforms disposed in the housing and configured to contact some of the hairpins, switches disposed in the housing, connected with the platforms, and configured to selectively change connections of the hairpins between wye and delta configurations, and a conduit defining a coolant channel through the housing.

A method for mounting a switching module to an end of a stator includes arranging a housing of the switching module over an end of the stator such that line and neutral hairpins projecting from the end of the stator contact electrically conductive platforms of the switching module that are electrically connected with switches configured to selectively change connections of the hairpins between a wye configuration and a delta configuration, welding the platforms to the hairpins, and filling at least some of the housing with a resin that surrounds the platforms and portions of the hairpins and hardens.

DETAILED DESCRIPTION

Figure 1:
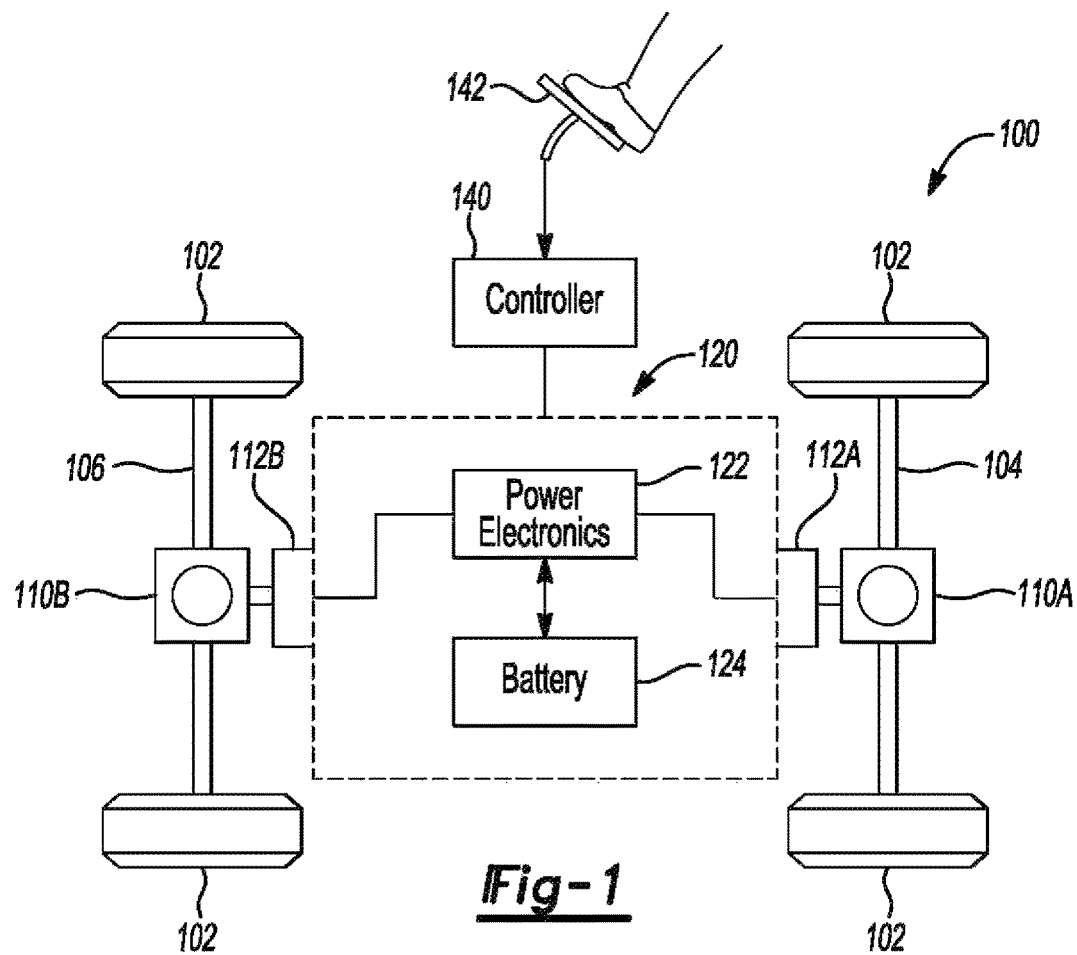
FIG. 1 is a schematic diagram of a vehicle.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An electric machine includes a number of windings that are electrically driven to produce torque, and may be a three-phase machine that is driven by a three-phase inverter. The windings of the electric machine may be connected to the inverter in a delta or a wye configuration. In the wye-connected configuration, the windings are connected in a Y-shape with each winding connected to a neutral point. In the delta-connected configuration, each winding is connected to the other two windings forming a triangle of sorts.

The wye- and delta-connected electric machines have distinct torque and power capability due to the respective winding connection configuration. A wye wound motor has high torque and power characteristics at lower speeds, while a delta wound motor has high torque and power characteristics at higher speeds. Benefits may be derived from a dynamic electric machine connection strategy. The dynamic electric machine connection strategy may implement a control strategy to manage transitions between the types of connections to optimize vehicle performance.

Here, a stator winding switching module and manufacturing process that utilizes the unique wye and delta motor characteristics are contemplated. The hardware implementation and associated control allow for electric vehicle versatility. In one example, a high-power switching module is provided that can quickly switch stator winding configurations between a wye or delta winding set. The module contains the switching mechanism (e.g., high-power triacs for alternating current, etc.), a fluid cooling system, and control hardware. To reduce inductive switching transients, torque may be reduced to zero Nm prior to switching or based on a specific torque threshold.

The switches may be sized for the peak line voltage and current required for either motor configuration (including increased line voltage from regenerative braking). The module can be installed on the stator end windings to allow for easier access to line and neutral connections (wound or hairpin end winding connections). As an example, a dual parallel stator with hairpin end windings will have multiple neutral and line connections (e.g., six hairpin connections for each phase winding). If the module is not installed directly on the stator windings, there may need to be several bus bar extensions from the stator hairpin windings to the module (if mounted elsewhere) to rearrange the winding connection to either a wye or delta, which may be less practical. Further, mounting the module on the stator windings would improve loss efficiency (e.g., reduced bus bar power losses) and provide closer proximity to cooling channels used for motor stator cooling. These cooling channels can be used as an interface for the proposed module cooling ports. Cooling mediums may include, but not be limited to, glycol or transmission fluid.

An example module may contain the high-power switches, internal winding connections, cooling channels, heat exchanger interfaces, temperature sensors, and low voltage control hardware. The module could be received as a shell or module with terminal weld points, winding switches, cooling channels, sensors, etc., to be later filled with an epoxy or other suitable material. The module would first be mounted to the stator end windings. Weld spatter shields could be introduced and the module permanently laser welded to the end windings. After welding, the module could be filled with a thermal epoxy to rigidly affix it to the stator windings. After the motor is installed in a transmission, the low voltage harness could allow for low voltage power and control for the winding switches as well as sensor signals or other interfaces to the module. Since the resolver stator low voltage harness and transmission bulkhead connectors may be in close proximity to the motor stator, it could be possible to 'tap' into the low voltage harness connections to interface with the module. This would allow for connection of the module to the inverter and thereby vehicle-side controllers.

The high-power switches may be Silicon (Si) based semi-conductors. With Silicon Carbide (SiC) power devices being introduced to the market, switching device package size will continue to decrease over time. SiC devices are well suited for high current, high power, and high temperature operation in a small package. While the size of these switching devices decreases, this may allow for improved packaging and cooling mechanisms.

Switching control could be utilized by monitoring motor fundamental frequency, which is proportional to motor speed. As an example, when the fundamental motor frequency reaches 400 Hz, the switching module could automatically switch to the delta winding configuration or vice versa.

Wye-delta switching modules can utilize available low voltage control harnesses, which would interface with various other modules to handle switching related functions—creating a number of possibilities for motor control (e.g., torque-split, efficiency optimization, high-speed regenerative capture, noise, vibration, and harshness optimization, etc.).

Alternatively, a specific inverter high voltage AC switching frequency can be used as a type of control mechanism for an internal processing module (or filter) to signal a switch of the motor configuration. As an example, circuitry could change its switching frequency to 4500 Hz (for a short time) to signal a switch to the wye winding configuration. Conversely, the inverter could change its switching frequency to 5500 Hz to signal a delta winding configuration. An internal or external frequency filter or processing module could detect this switching frequency or such signals directly from vehicle communication channels (e.g., CAN communication). This can be used as a means for signaling a switching scenario to the motor to reduce low voltage harness wiring.

Referring to FIG. 1, a vehicle 100 is shown. The vehicle 100 may include a set of wheels 102. The wheels 102 may be coupled to a front axle 104 or a rear axle 106 configured to drive the wheels 102. The vehicle 100 may include one or more electric machines 112 that are coupled to a respective axle via a corresponding gearbox 110. The vehicle 100 may include a front-drive electric machine 112A that is mechanically coupled to a front axle gearbox 110A. The vehicle 100 may include a rear-drive electric machine 112B that is mechanically coupled to a rear axle gearbox 110B. The front axle gearbox 110A and the rear axle gearbox 110B may be coupled to the front axle 104 and the rear axle 106, respectively. The gearboxes 110 may include a differential for transferring torque from the corresponding electric machine 112 to the corresponding axle and wheels 102. In other configurations, an electric machine may be coupled to each of the wheels directly or via an associated gearbox. Such a configuration would have four electric machines. Any number of electric machines and configurations thereof are contemplated and may be referred to collectively as an electric machine or a plurality of electric machines.

The electric machines 112 may be operated by one or more power electronics modules 122. The power electronics modules 122 may be powered by a traction battery 124. The power electronics modules 122 may be directed or controlled by a controller 140. The controller 140 may include gate drivers or other hardware to drive switches of the power electronics module 122 along with processors, memory, and communications to perform logic functions and exchange information. The controller 140 may include one or more processors and controllers configured to perform such functions. The controller 140 may further include various types of computing apparatus in support of performance of the functions of the controller 140 described herein. In an example, the controller 140 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, for example, from the storage, etc., to a memory and executes the instructions using the data, thereby performing one or more processes, including one or more of the processes described herein. The controller 140 may receive a control signal of a pedal(s) 142 from operators of the vehicle 100 or similar autonomous commands. The controller 140 may also determine autonomous commands and otherwise drive the vehicle 100 autonomously.

Figure 2:
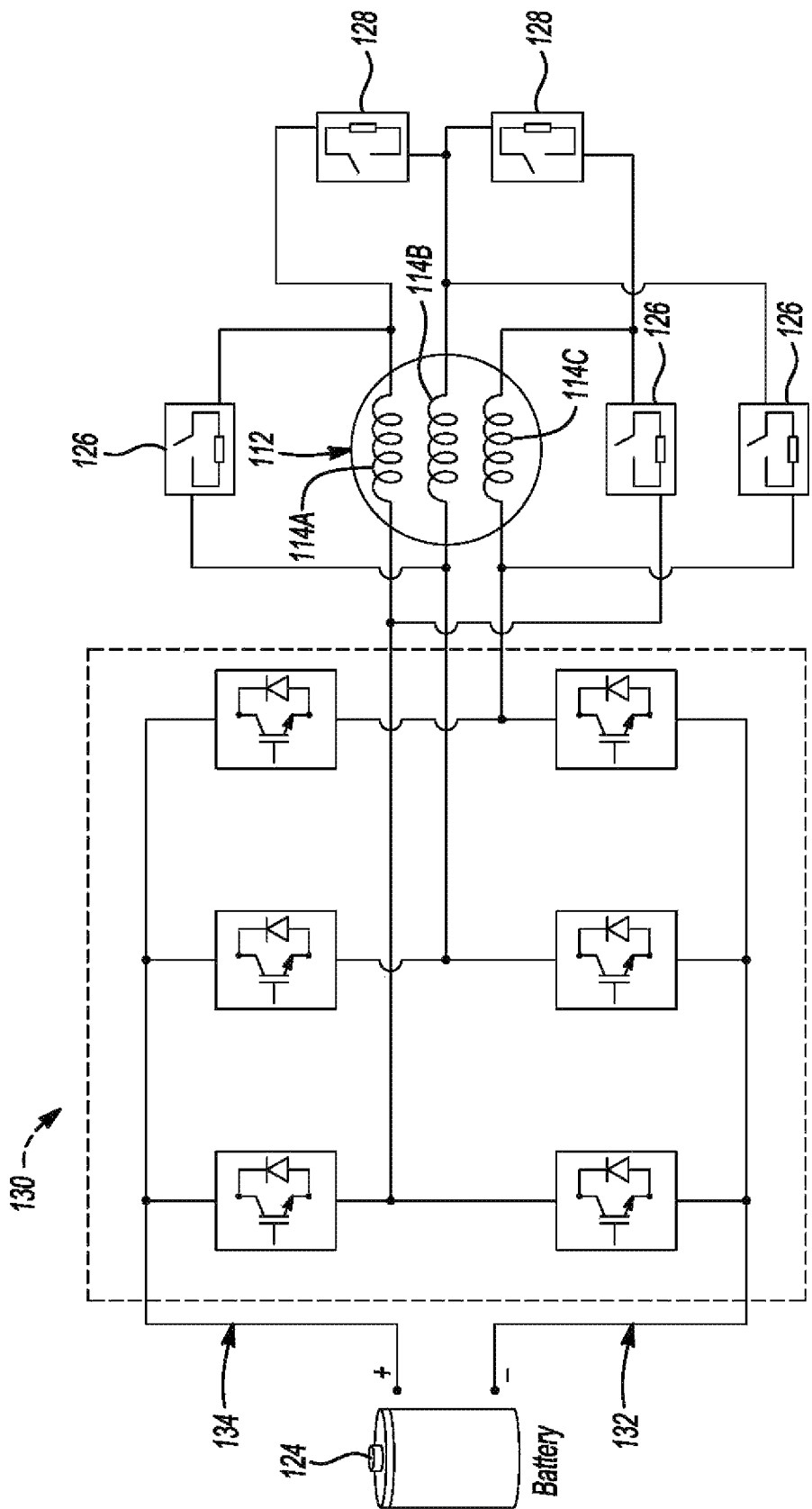
FIG. 2 is a schematic diagram of a power electronics system.

Referring to FIG. 2, a power electronics configuration is shown for operating the electric machines 112. The traction battery 124 may be used to energize or receive energy from the power electronics configuration 200. The power electronics configuration 200 may include one or more inverters 130 that include a set of switching elements configured to convert a direct current (DC) voltage from the traction battery 124 to an alternating current (AC) signal for the electric machines 112. The traction battery 124 energizes terminals or rails 132, 134 of the inverters 130. As shown, the inverters 130 may selectively energize the windings 114A, 114B, 114C corresponding to the associated phases of the electric machine 112 by operation of the switching elements. The controller 140 may operate the inverters 130 to cause the electric machines 112 to generate torque. The controller 140 may implement various control strategies such as vector control or field-oriented control to control the torque output of the electric machines 112. In the present example, the front-drive electric machine 112A and the rear-drive electric machine 112B may be driven by the inverters 130.

The windings 114A, 114B, 114C may be selectively arranged or configured in a delta or a wye configuration. One or more sets of switches may be configured to selectively connect each of the electric machines 112 in one of a wye and a delta connection. The windings 114A, 114B, 114C may be associated with a set of delta switches 126 that configure the windings 114A, 114B, 114C as a delta connection when closed. The windings 114A, 114B, 114C may be associated with a set of wye switches 128 that configure the windings 114A, 114B, 114C as a wye connection when closed. Other winding configurations may be used. That is, additional inverters 130 may be used to alternately power an additional set of windings such that the switches 126, 128 as shown are not necessary. Meaning, the electric machine 112 may be double wound with independent wye and delta windings, or the electric machine 112 may also be wound with independent wye and delta switches 126, 128 to selectively create wye and delta windings, or some combination thereof. Any configuration, combination, addition, or subtraction of inverters 130, electric machines 112, and windings 114A, 114B, 114C known and unknown is contemplated. The controller 140 may be programmed to operate the switches 126, 128 to selectively connect each of the electric machines 112 in one of the wye and the delta connection based on various criteria (e.g., speed).

Figure 3A:
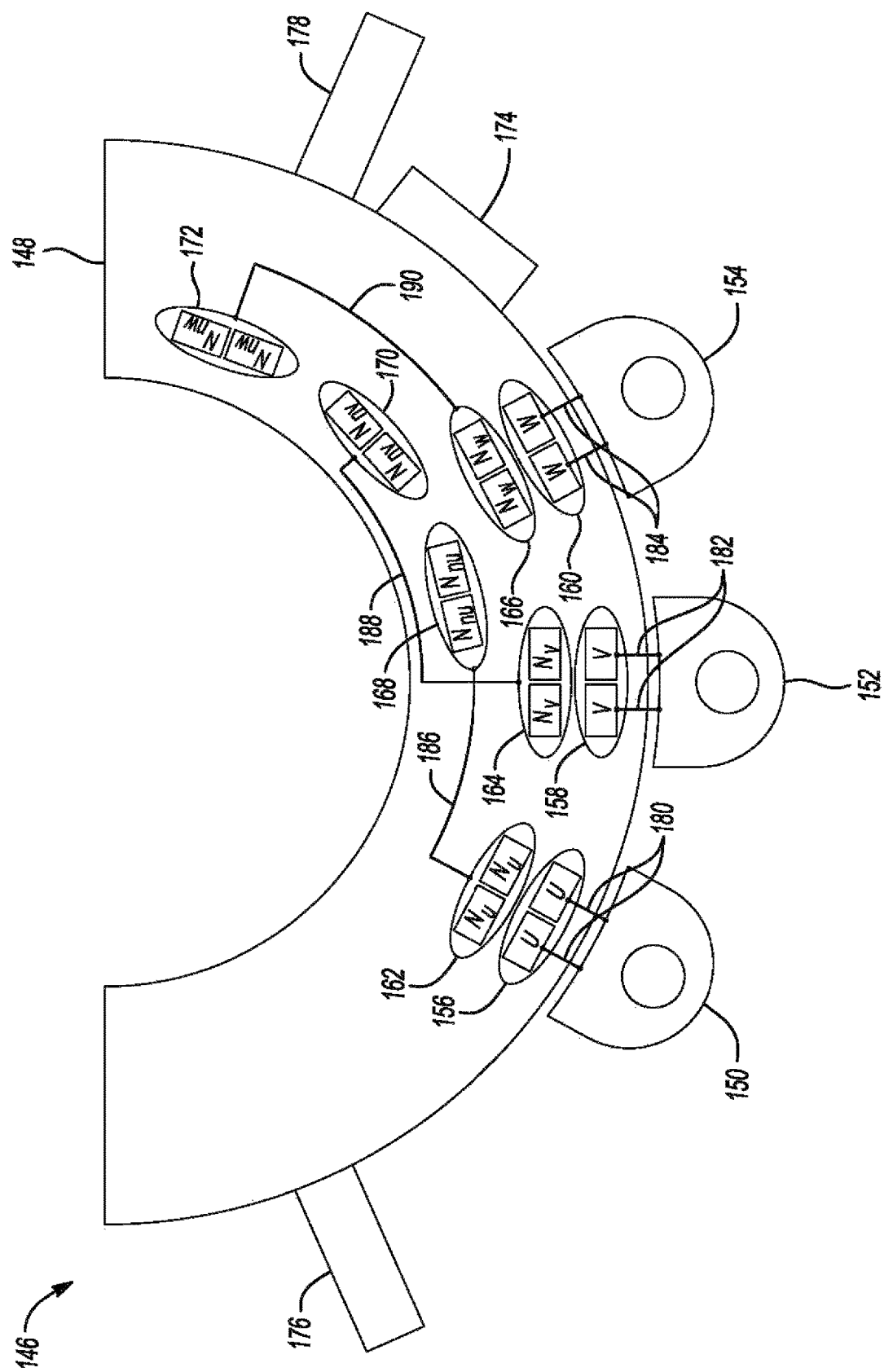
FIGS. 3A through 3D are schematic diagrams of a switching module.
Figure 3B:
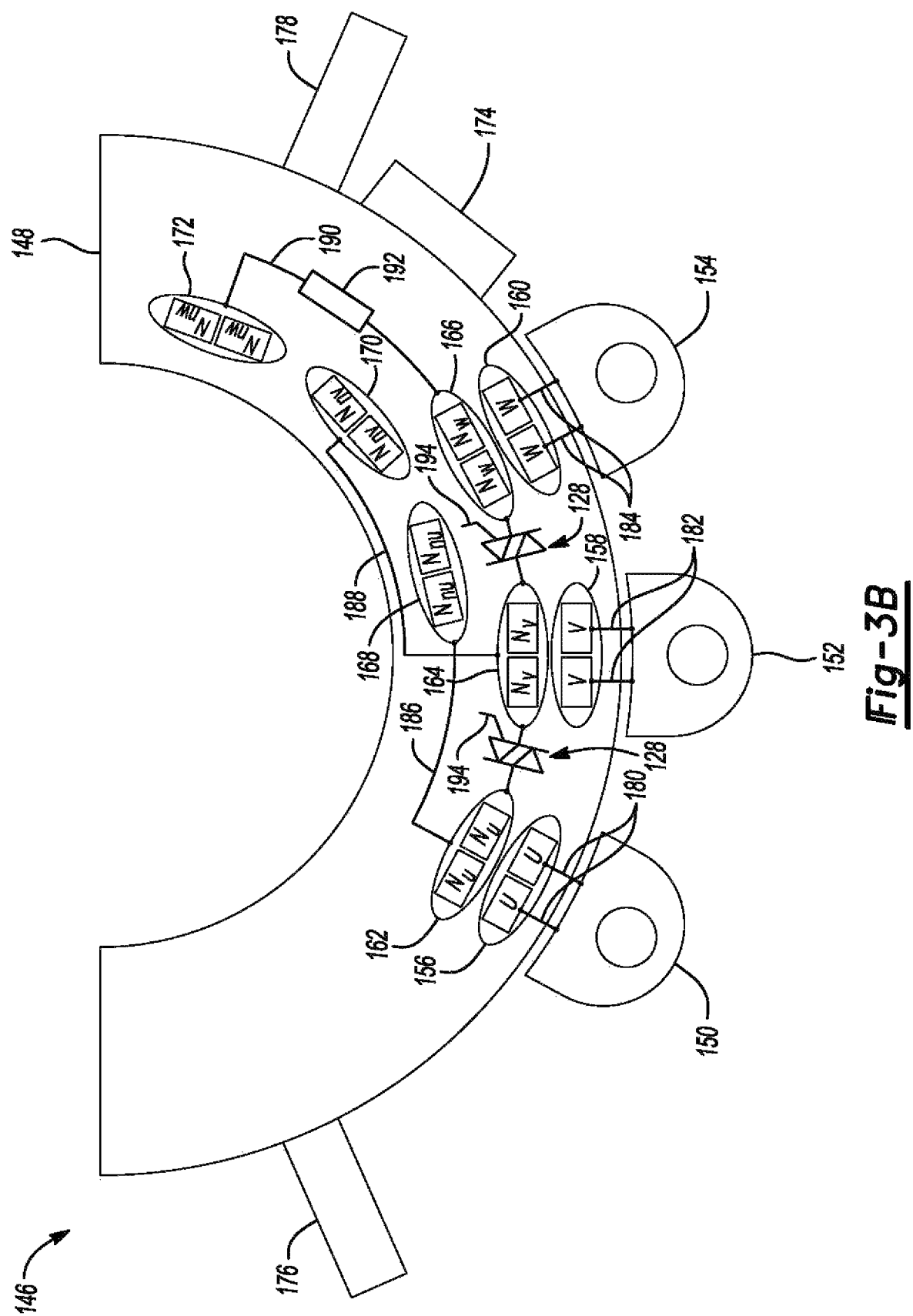
Figure 3C:
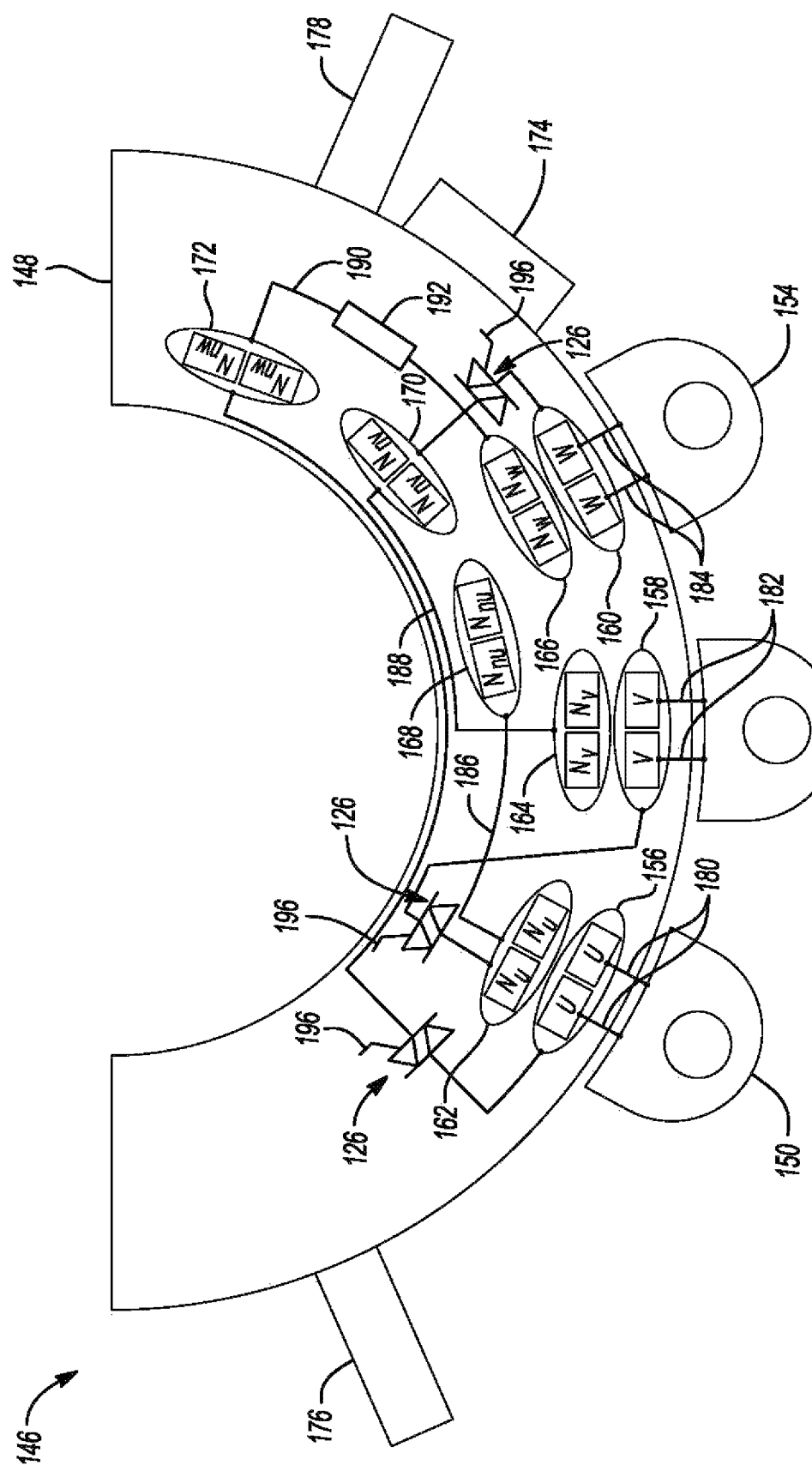
Figure 3D:
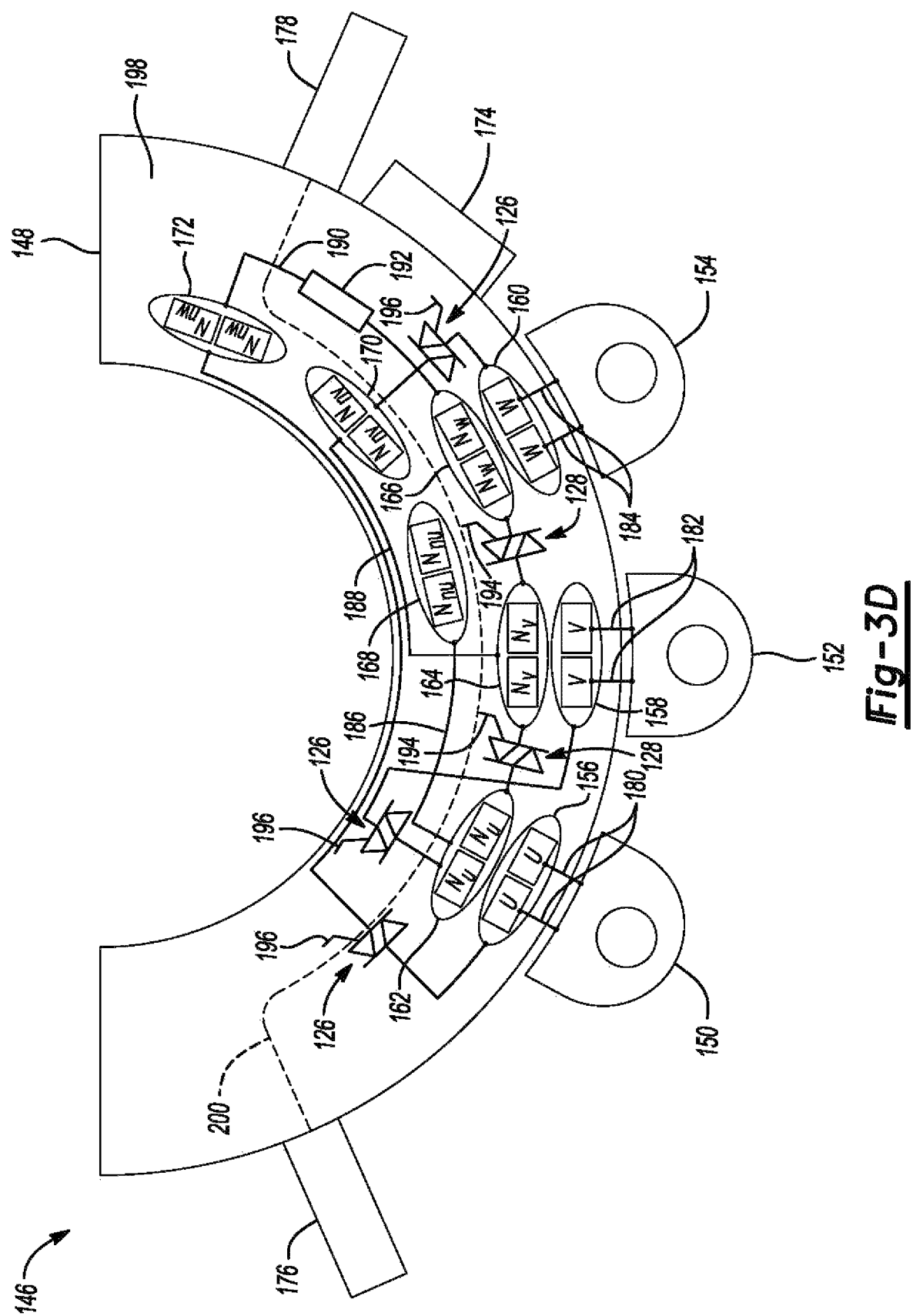

Referring to FIGS. 3A through 3D, a switching module 146 is shown. To facilitate understanding, FIGS. 3A through 3C each show certain components of the switching module 146, whereas FIG. 3D shows all the components of FIGS. 3A through 3C together. The switching module 146 includes a housing 148, line connections 150, 152, 154, weld platforms 156, 158, 160 for corresponding U-phase, V-phase, and W-phase hairpins U, V, W respectively, weld platforms 162, 164, 166 for corresponding neutral phase hairpins $N_u$, $N_v$, $N_w$ respectively, and weld platforms 168, 170, 172 for corresponding neutral phase hairpins $N_{nu}$, $N_{nv}$, $N_{nw}$ respectively. The switching module 146 further includes a low voltage interface 174 and cooling ports 176, 178.

The line connections 150, 152, 154 are respectively electrically connected with the hairpins U, V, W via bus bars 180, 182, 184. The weld platform form 162 is electrically connected with the weld platform 168 via bus bar 186. The weld platform 164 is electrically connected with the weld platform 170 via bus bar 188. The weld platform 166 is electrically connected with the weld platform 172 via bus bar 190. Unless otherwise stated, such electrical connections are separate.

Referring to FIG. 3B, the switching module 146 further includes the switches 128 and a thermistor 192. One of the switches 128 is electrically connected between the weld platforms 162, 164. The other of the switches 128 is electrically connected between the weld platforms 164, 166. The switches 128 allow current flow in either direction, and each includes a control signal line 194 electrically connected with the low voltage interface 174: Command signals from the controller 140 for the switches 128 can be provided via the low voltage interface 174. The thermistor 192, in this example, is mounted on the bus bar 190 and is electrically connected with the low voltage interface 174 such that signals therefrom are accessible via the low voltage interface 174.

Referring to FIG. 3C, the switching module 146 further includes the switches 126. One of the switches 126 is electrically connected between the weld platforms 156, 172. One of the switches 126 is electrically connected between the weld platforms 158, 162. And one of the switches 126 is electrically connected between the weld platforms 160, 170. The switches 126 allow current flow in either direction, and each includes a control signal line 196 electrically connected with the low voltage interface 174: Command signals from the controller 140 for the switches 126 can be provided via the low voltage interface 174.

Referring to FIG. 3D, the housing 146 in this example is filled with a resin (e.g., epoxy) 198 that defines a cooling channel 200 between the cooling ports 176, 178. A conduit may also be included for such purpose. Coolant can be directed through the housing 146 and in the vicinity of the switches 126, 128 to carry heat generated by them away from the switching module 146.

Figure 4:
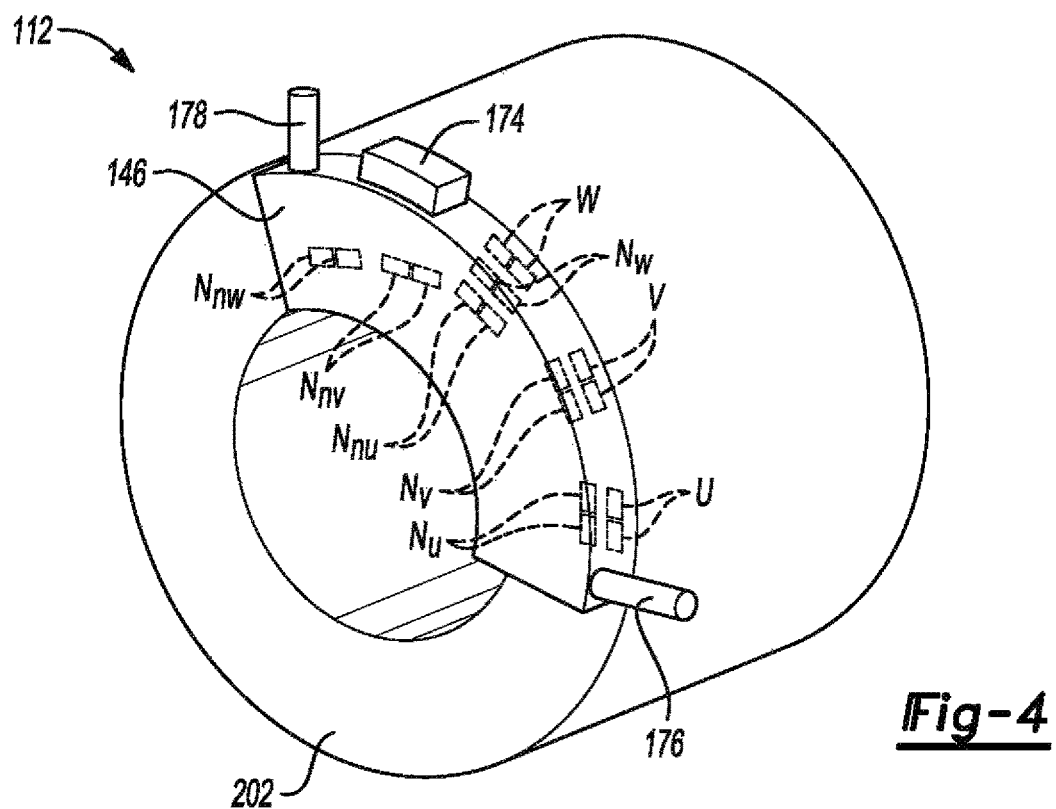
FIG. 4 is a perspective view of a stator and the switching module of FIGS. 3A through 3D.

Referring to FIG. 4, one of the electric machines 112 includes a stator 202 and the switching module 146 attached directly to an end of the stator 202 over some of the U, V, and W phase hairpins and neutral hairpins.

An electric machine connected in a wye configuration may be capable of generating higher peak torque and lower peak power than if the electric machine were connected in a delta configuration. In some configurations, the electric machine may be a permanent magnet synchronous motor (PMSM). The PMSM generates a torque that is proportional to the current supplied to the windings. When supplied current and peak generated torque are the same between a wye and delta connected electric machine, the increased phase voltage of a delta winding allows for higher power capability and thereby increased torque at higher speeds. The inverters 130 may be configured with voltage and frequency modulation capability. As such, the torque may be directly controlled in either a wye configuration or a delta configuration.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine assembly comprising:
   a stator including three or more phase hairpins and neutral hairpins; and a switching module attached directly to an end of the stator and over the phase hairpins and neutral hairpins, and including a housing defining a cavity containing (i) platforms in contact with the some of the phase hairpins and neutral hairpins and (ii) switches connected with the platforms and configured to selectively change connections of the phase hairpins between a wye configuration and a delta configuration.

2. The electric machine assembly of claim 1, wherein the switching module further includes a heat exchanging coolant channel configured to route coolant by some of the switches or through a heat exchanger that is in contact with the switches.

3. The electric machine assembly of claim 2, wherein the housing defines inlet and outlet ports for the coolant channel or heat exchanger interfaces.

4. The electric machine assembly of claim 1, wherein the housing has an arcuate shape.

5. The electric machine assembly of claim 1, wherein the switching module further includes a thermistor mounted to at least one of the platforms or bus bar connections.

6. The electric machine assembly of claim 1, wherein the switching module further includes a signal interface carried by the housing and electrically connected with the switches.

7. The electric machine assembly of claim 1, wherein the platforms are configured to permit the phase hairpins and neutral hairpins to project therethrough.

8. A switching module for a stator comprising:
a housing configured to be attached directly to an end of the stator and over line and neutral phase hairpins of the stator;
electrically conductive platforms disposed in the housing and configured to contact some of the hairpins;
switches disposed in the housing, connected with the platforms, and configured to selectively change connections of the hairpins between wye and delta configurations; and
a conduit defining a coolant channel through the housing.

9. The switching module of claim 8, wherein the housing defines inlet and outlet ports for the coolant channel.

10. The switching module of claim 8, wherein the housing has an arcuate shape.

11. The switching module of claim 8, wherein the switching module further includes a thermistor mounted to at least one of the platforms or internal bus bar connections.

12. The switching module of claim 8, wherein the switching module further includes a signal interface carried by the housing and electrically connected with the switches.

13. The switching module of claim 8, wherein the platforms are configured to permit the hairpins to project therethrough.

14. A method for mounting a switching module to an end of a stator comprising:
arranging a housing of the switching module over an end of the stator such that line and neutral hairpins projecting from the end of the stator contact electrically conductive platforms of the switching module that are electrically connected with switches configured to selectively change connections of the hairpins between a wye configuration and a delta configuration;
welding the platforms to the hairpins; and
filling at least some of the housing with a resin that surrounds the platforms and portions of the hairpins and hardens.

15. The method of claim 14 further comprising attaching a wiring harness to a signal interface carried by the housing.

* * * * *